United States Patent [19]
Zimmermann et al.

[11] 3,836,842
[45] Sept. 17, 1974

[54] ENCAPSULATED ELECTRICALLY RESONANT CIRCUIT AND INTERROGATING APPARATUS AND METHOD FOR FINDING SAME IN VARIOUS LOCATIONS

[75] Inventors: Detlef Zimmermann, Ottawa, Ontario; James Hugh Lougheed, Kanata, Ontario, both of Canada

[73] Assignee: Bell Canada-Northern Electric Research Limited, Ottawa, Ontario, Canada

[22] Filed: Jan. 22, 1973

[21] Appl. No.: 325,518

[52] U.S. Cl. ...... 324/34 R, 324/3, 324/6, 336/96, 336/179, 340/258 C, 340/282, 324/41
[51] Int. Cl. ...... G01v 33/00
[58] Field of Search ...... 324/34 R, 34 O, 41, 3, 324/6; 340/258 R, 258 C, 258 D, 280, 282; 336/179, 90, 96

[56] References Cited
UNITED STATES PATENTS

| | | | |
|---|---|---|---|
| 2,438,197 | 3/1948 | Wheeler | 324/41 |
| 2,584,592 | 2/1952 | Kehbel | 336/179 |
| 2,954,538 | 9/1960 | Horgan | 336/179 |
| 3,465,724 | 9/1969 | Broadbent | 340/258 C |
| 3,500,373 | 3/1970 | Minasy | 340/258 R |
| 3,740,742 | 6/1973 | Thompson et al. | 340/258 C |

*Primary Examiner*—Robert J. Corcoran
*Attorney, Agent, or Firm*—John E. Mowle

[57] ABSTRACT

Locations, typically outside locations, are marked by a passive marking device placed therewith. The marking device is responsive in a damped oscillatory manner when radiated by at least one pulse of magnetic energy, i.e., an induction field. An interrogating instrument is the source of the induction field. After an induction field has been generated, the interrogating instrument monitors the frequency spectrum within which the marking device is resonantly responsive. When a response is detected the interrogating instrument provides an indication of the response. The marking device is particularly useful for marking locations which are buried or are from time to time concealed. With a portable interrogating instrument, an operator, traversing the general area of a location, is thus able to find the location without the aid of a visible stake or other similar fixture.

5 Claims, 18 Drawing Figures

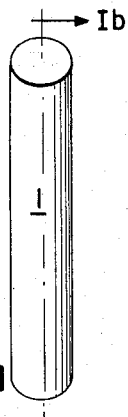
Fig. 1a
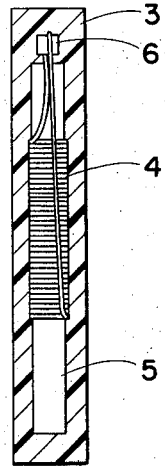
Fig. 1b
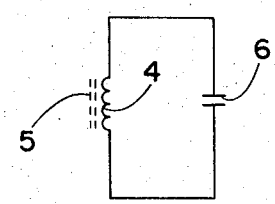
Fig. 1c
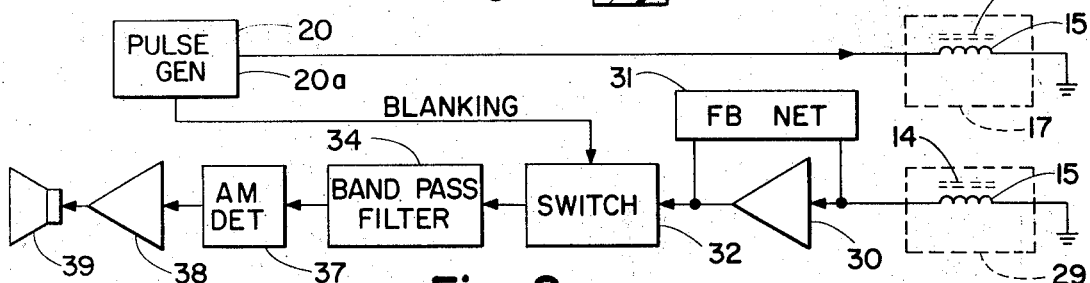
Fig. 2a
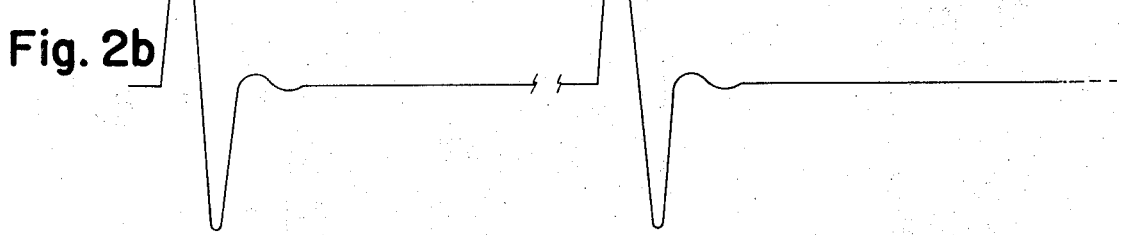
Fig. 2b
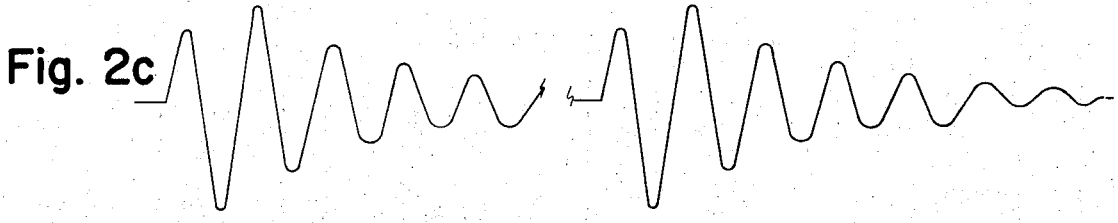
Fig. 2c
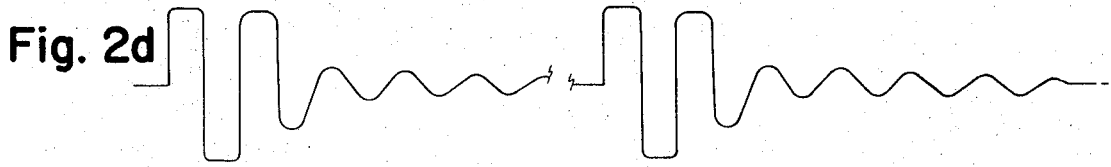
Fig. 2d
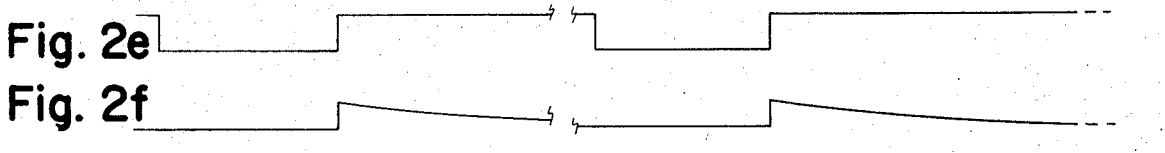
Fig. 2e
Fig. 2f

ENCAPSULATED ELECTRICALLY RESONANT CIRCUIT AND INTERROGATING APPARATUS AND METHOD FOR FINDING SAME IN VARIOUS LOCATIONS

The present invention relates to position or location marking devices, magnetically responsive to interrogation and to apparatus for recognizing the nearby presence of such marking devices.

Utilities and land surveyors typically are concerned with finding the exact location of their buried facilities. These buried facilities range from pipes, cable and junction boxes to survey monuments and bench marks. Often the exact location of a facility is obscured by snow or overburden which covers the surface marker originally placed adjacent or above the location. Various methods and apparatus have been used in an effort to record and locate physical locations of buried facilities with varying degrees of success. Nevertheless many man hours are wasted in marking large searching excavations when access to these locations is required.

A particularly vexing problem regarding telephone facilities occurs during installation of facilities and services in new housing developments. In the first phases of the development, adequate telephone cabling is buried, for example along property division lines, with provision for connection of customer services at certain locations along the cable. Each connection location is typically visibly marked by a wooden stake placed adjacent the location. No further telephone installation activity is carried on until the houses in the development are nearing completion and at least the rough ground contour established, ready for landscaping. Telephone company personnel return to the development to install a ground terminal housing at each connection location and individual customer service wires between each house and the various connection locations. Unfortunately, some of the wooden stakes originally marking the connection locations have by this time been lost. Typically the lost stakes have been buried during grading of the ground contour or otherwise removed. Thus these exact locations are no longer known.

The only practical solution to this problem has been to approximately locate an unmarked connection location and excavate until the exact location is found and accessible. Typically in new developments most nearby reference points, which may be a useful aid in determining the location, have been obliterated or were not originally noted. Also it is not uncommon to have connection locations which were originally covered by 1 to 2 feet of earth, covered with up to 6 feet of earth after the rough ground contours have been established. The uncertainty of an exact location coupled with the newly established ground contours can sometimes result in an excavation of immense proportions in relation to that required at a well marked location. Further, such excavations cannot be carried out efficiently with the use of heavy machinery because of the risk of damaging the buried cable. Consequently, access to an unmarked location can be quite labour intensive and costly.

Another problem in locating facilities often occurs in the winter months, particularly in those areas where heavy snowfalls occur. Ground level terminal housings, associated with buried telephone cables, usually protrude above the existing grade level to a height of between about 1 to 3 feet. Accumulated snow often conceals these terminal housings for a few months each winter. Although fence lines and other visible landmarks are of considerable help in locating concealed terminal housings, there is again a significant labour cost incurred when a searching excavation in the snow is made.

Maps, recording the locations of buried facilities, have proven to be woefully inadequate. Use of maps has consistantly shown inaccuracies in the original recording of the physical location and is further often hampered by the relocation, removal or concealment of nearby reference points.

Some devices have evolved which aid in finding the location of facilities by their various particular electrical properties or acoustical properties. Thus, depending upon the type of facility a particular type of locating device is most effective. Regarding telephone and other electrical facilities, a buried cable or portion thereof may sometimes have an identifiable signal applied to it. A portion of the signal, radiating therefrom, is traced along the surface with the aid of a receiver. This method does not always yield the required information, for example the location of a terminal facility, intermediate the length of the cable. Often this method cannot be used because the cable is in service or it may be of such construction or have such faults that the signal will not adequately propagate or radiate.

Passive marking devices, such as iron rods or permanent magnets, have been considered as a solution to this problem. Iron rods or permanent magnets can be placed with buried facilities and thus be detected by the magnetic anomalies associated with them. One major disadvantage is that there are magnetic anomalies, of varying degrees, associated with at least all ferrour items. It is impossible, in some circumstances, to determine whether or not a magnetic anomaly is evidence of a prior placed marker or merely evidence of a randomly buried item of ferrous content.

Active devices have also been considered. One such device might be in the form of an active transponder. An active transponder, however, would require some external power source, be it a remote source directly wired to it or some means for power conversion of radiated energy from another energy source. A directly wired source is exhorbitantly expensive in conductor cost alone. Alternately, it appears that a power conversion means would be of doubtful utility or of high cost or both. It is thus doubtful that an active transponder could be economically made to function satisfactorily.

Another active device which was thought for a time to be an acceptable locating aid was that of a small low intensity radioactive source. The radioisitope Cobalt 60 is quite suitable and is easily detected with a number of relatively inexpensive instruments. Although this device is technically feasible there are a number of practical limitations. Radioactive sources require handling and placement by specially trained personnel. Elaborate storage and security facilities are required. Regulating agencies, concerned with the use of atomic energy and health of the populace, must be continuously informed as to the location of each existing device. Devices inadvertently damaged and/or lost, for example during re-excavation, must be totally recovered regardless of the cost involved. An uniformed public could become unduly concerned thus causing a severe public relations problem with the possible necessity of withdrawing all suc radioactive sources from use It has been found that a passive marking device, basically a high Q resonant circuit, can be placed in a location to provide the location with a distinctive inducation field characteristic, corresponding to ringing in the marking device, immediately after the location is exposed to a pulse of magnetic energy. Presently the very low electromagnetic frequency spectrum is relatively quiet. In the area of the spectrum between about 60 KHz to 80 KHz there is generally very little man-made or natural radiated energy present. Coupled with this, energy radiated in the very low frequency spectrum, for example between about 40 KHz to 200 KHz, possesses relatively good subterranean propagation characteristics. Thus a portion of the very low frequency spectrum is well suited to utilization in location marking. A buried location can be marked by placement of a marking device therewith and later detected by a suitable interrogating apparatus. A suitable interrogating apparatus includes an inducation field generating and detecting means. In operation a pulse of magnetic energy or induction field is generated. Immediately thereafter the presence of any lingering induction field is detected in the apparatus. The nearby presence of a marking device is sensed when the apparatus detects the alternating magnetic field characteristic associated with the damped oscillatory ringing in the marking device. The induction field generating and detecting means includes an antenna of the loop variety which is of very small physical dimensions in relation to the wavelength of the frequency of the field generated. In operation it tends to act more like a transformer winding rather than the well known transmitting antenna. The only significant energy field associated with this antenna is an induction field which is well known to be generally confined to an area around the antenna of a radius dimension of less than one wavelength of the frequency being transmitted. Hence the term induction coil or coil is used as meaning a loop antenna of relatively very small physical dimensions in relation to the wavelength of the frequency at which it is operated.

In one particular arrangement, an interrogating apparatus includes radiating and receiving coils, which can be viewed as primary and secondary transformer windings. In this case the marking device or marker can be viewed in function as a tuned tertiary winding. Such the interrogating apparatus is operated in the proximity of the marker, the marker is loosely coupled with the primary and secondary windings in a transformer-like arrangement. In application the marker, i.e., the tuned tertiary winding, is positioned in the location to be marked. A portable interrogating apparatus, which includes the primary and secondary windings, is operated such that a current pulse is supplied to the primary winding to create an expanding and then contracting magnetic field, i.e., an induction field. The tertiary winding, when within a few feet of the primary winding, receives some magnetic energy from the primary winding and resonantly re-radiates some of the magnetic energy in a damped oscillatory manner thus providing the required induction field characteristic. Signals induced in the secondary winding are sampled after the cessation of the current pulse supplied to the primary winding. The nearby presence of the tertiary winding is detected when some of the re-radiated energy induces a signal in the secondary winding.

The marking device or marker includes an encapsulation containing a coil or wire, i.e., an inductor, wound about a magnetically soft core material with the ends of the coil termination at a capacitive element. The coil material is essential in providing a high magnetic field capture or concentration function in the marking device. In operation the marker desirably absorbs as much energy as is possible and thereafter resonates for an extended period of time to enable detection of its presence. Thus the core material must be highly permeable and exhibit low loss characteristics. Suitable core materials were found to be of the powdered iron variety, generally known as ferrite. Such materials have desirable magnetic properties, however, when these materials are used to provide a sintered ferrite structure, the structure's, resistance to mechanical shock is relatively low. Hence, elongated sintered ferrite core structures tend to be very fragile, that is they break or shatter when subjected to mild mechanical shock, such as for example that resulting from careless handling. A fragile marking device is impractical for the general applications envisaged and thus a somewhat resilient polyethylene encapsulation was tried to provide a marker with resistance to deterioration from outdoor and subterranean environments and to breakage from mechanical stress and shock. Surprisingly, in practice this type of encapsulation was found to be worse than no encapsulation at all. Although the polyethylene encapsulation did strengthen the marker and protect it from the environment, it did not render it impervious to severe mechanical shock but only appeared to do so. The core material could be fractured with no visible indication of such. Even a minor fracture in the core material shifts the resonant frequency of a marking device to such a degree as to render its use marginal or even unsatifactory.

It was found that an encapsulation of a material at least as rigid or brittle as the core material and bonded to the surface of the core material, provides a strenghtened marking device, which will visibly and decisively fracture when mechanically overstressed. A thermosetting epoxy resin has been found to provide a satisfactory encapsulation. A marker thus encapsulated need only be subjected to a quick visual inspection to assure ito integrity before placement in a location.

The present invention is a passive marking device for placement in a location to provide the location with an induction field characteristic. The induction field characteristic is detectable by an appropriate interrogating instrument. The marking device comprises a passive resonant electrcial network including an elongated sintered ferrite core. The network is encapsulated in a electrically insulating material which is is at least as brittle as the core material as that the core is mechanically reinforced. In the event of mechanical damage to the core the encapsulation is likewise damaged, such damage being detectable by visual inspection.

The present invention is also an interrogating instrument for indicating the presence of a marking device which includes a passive resonant electrical network. The interrogating instrument comprises means for generating a continuous wave magnetic field and a means for detecting a fluctuating magnetic field. The field is of a frequency suitable to induce resonance in the network and is generated on an interrupted basis. The presence of a marking device is indicated when the detection means detects the magnetic field resulting from resonance of the marking device, during interruptions in the field from the generating means.

The present invention is also a method of finding the location of a marking device which includes a passive resonant electrical network. The method comprises the steps of generating an induction field on an interrupted basis to induce ringing in the network, while traversing the general area adjacent the marking device and detecting the induction field resulting from resonance of the marking device, during the interruptions in the induction field being generated.

Example embodiments are described in the following, with reference to the accompanying drawings in which:

FIG. 1a is a graphic illustration of a marking device in accordance with the invention;

FIG. 1b is a partial section of the marking device taken along a line 1b–1b in FIG. 1a;

FIG. 1c is a schematic diagram of the marking device illustrated in FIGS. 1a and 1b;

FIG. 2a is a block and schematic drawing of an interrogating instrument in accordance with the invention for use in finding a location marked with the marking device illustrated in FIGS. 1a–c;

FIGS. 2b, 2d, 2e and 2f illustrate typical waveforms, found at various points within the interrogating instrument in FIG. 2a, during its operation;

FIG. 2c illustrates a typical responsive waveform in the marking device in FIGS. 1a–1c;

Figure 3:
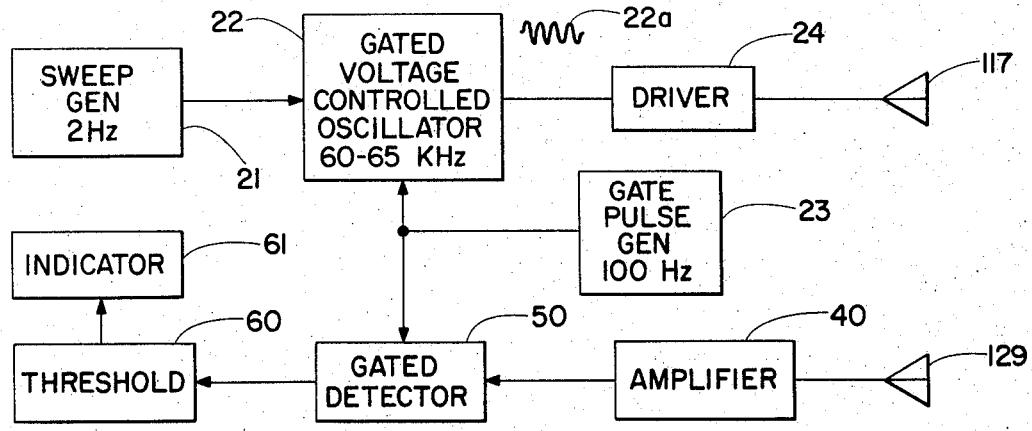
FIG. 3 is a block diagram of an interrogating instrument somewhat similar to the interrogating instrument in FIG. 2a and having an extended range of operation in combination with the marking device illustrated in FIGS. 1a–1c.

Referring to FIGS. 1a, 1b and 1c, the marking device 1 is an encapsulated passive resonant electrical circuit of an elongated cylindrical shape. A coil of insulated conductor wire 4 placed on a ferrite magnetically soft elongated core 5 forms the inductive portion of a tank circuit. A capacitor 6 connected in parallel with the coil completes the tank circuit. Ideally, an almost infinite Q circuit is desirable and thus the coil 4 and the capacitor 6 must be of reasonably low resistance and loss respectively. Likewise the core 5 must be of a low loss material. It is also desirable that the resonant frequency be stable with respect to wide temperature variations. Since the coil and core inherently have positive temperature coefficients the capacitor 6 is preferably of the polystyrene type having a negative temperature coefficient. Thus the marking device 1 is at least partially temperature-compensated. A suitable core material has been found to be SIFERRIT material, type M25, in the form of a longitudinally slotted rod available from Siemens Canada Ltd. or Siemens America Incorporated.

In one embodiment of the marking device, the core 5 is 1 cm. in diameter and 20 cm. in length, the capacitor 6 has a capacitance of about 5,600 pf and the coil 4 is of LITZ wire, 5 strands of 36 gauge insulated copper wire and has 120 turns in a single wound layer. The making device so constructed is finely tuned by adjusting the longitudinal position of the coil 4 on the core 5 so that it exhibits a resonant frequency of about 62.5 KHz.

It was first thought that an encapsulating material of a semi-rigid nature, for example polyethylene, would be suitable to protect the marking device from the elements and also provide substantial resistance to mechanical damage. However a polyethylene encapsulation was found to permit the mechanically brittle core 5 to fracture without any external visible evidence of damage to the device. Thus it was evident that this type of encapsulation would permit the use of damaged marking devices, having deteriorated electrical characteristics, in many cases where the damage would only be evident after installation in a buried location when the device is interrogated. Thus the marking device is provided with a rigid encapsulation 3, such as for example a thermosetting epoxy material, which will decisively break or shatter along with the core 5, when the marking device is subjected to a damaging mechanical shock.

In use, the marking device is placed adjacent a location. In the case where facilities are being installed in an excavation, the marking device is placed adjacent the facilities but at least 2 inches away from metallic articles, usually with its longitudinal axis aligned in a vertical direction. In the case where the excavation is very deep the marking device should be placed at an intermediate level between the floor of the excavation and the existing or proposed grade level. The depth to which a marking device may be buried and provide a satisfactory detectable response is dependent upon the operating parameters of the interrogating instrument used. The marking device can be found at a depth, that is over a distance, in excess of 10 feet when the interrogating instrument in FIG. 3 is used. However, in practice for convenient and unmistakable identification of a location the marking device is typically not used at a depth of more than about 8 feet.

Referring to FIG. 2a, induction coil 17 is connected between the output of a pulse generator 20 and a common ground connection. The induction coil 17 includes a magnetically soft core 14 with a coil 15 wound thereon. An induction coil 29, similar to the induction coil 17, is connected between the common ground connection and the input of amplifier 30. The output of the amplifier 30 is connected to the signal input of a switch 32. The switch 32 also has a control input which is connected to a blanking lead 20a from the pulse generator 20. An overload protection and feedback network 31 is connected between the input and output of the amplifier 30. The output of the switch 32 is connected to the input of a bandpass filter 34. The output of the bandpass filter 34 is connected to an amplitude modulation detector 37, the output of which is connected to a loudspeaker 40 via an amplifier 38.

In operation a pulse of electrical current is generated by the pulse generator 20 and applied to the induction coil 17. An induction field is correspondingly generated, as illustrated in FIG. 2b. A portion of the magnetic energy in the induction field is absorbed by the induction coil 29 and applied as a corresponding voltage signal to the input of the amplifier 30. The voltage applied in this instance is relatively large and thus the network 31 acts to limit the voltage so that the amplifier 30 is prevented from going into hard saturation. The output voltage from the amplifier 30 is terminated at the switch 32 which is controlled via the blanking lead 20a by a blanking pulse from the pulse generator 20, as illustrated in FIG. 2e. After generation of the induction field has been terminated, the switch 32, under the control of the blanking pulse, connects the output signal voltage from the amplifier 30 to the bandpass filter 34. The signals from the induction coil 29 are thus amplified by the amplifier 30 and filtered by the bandpass filter 34. Thus only signals within a predetermined frequency spectrum are connected from the output of the bandpass filter 34 to the amplitude modulation detector 37. The amplitude modulation detector 37 detects the voltage applied thereto, in a well known manner, after which the detected voltage is amplified by the amplifier 38. When amplitude modulation is detected by the detector 37, as exemplified in FIG. 2f, it is converted to an audible sound by the loudspeaker 39.

The induction field is generated, as illustrated in FIG. 2b, on a repetitive basis, during which a relatively high amount of magnetic energy is absorbed by the induction coil 29. The gain of the amplifier 30 is severely limited due to the action of the network 31. In FIG. 2d a waveform exemplary of that at the output of the amplifier 30 is limited during the first few cycles, that is during the time interval of the induction field in FIG. 2b. During the periods of time between the generation of induction fields, relatively little magnetic energy is absorbed by the induction coil 29, with very low voltage level signals resulting therefrom. During these periods the network 31 provides very little negative feedback, allowing the gain of the amplifier 30 to exceed at least 100. Accordingly, very low voltage level signals are amplified as exemplified by the waveform following the first few cycles in FIG. 2d, and thereafter filtered and detected as described above.

When the interrogating instrument is operated near a marking device, the marking device absorbs some of the magnetic energy in the generated induction field and responds in a damped oscillatory manner as illustrated in FIG. 2c. Thus the induction coil 17 acts similar to a primary winding in a very loosely coupled transformer the marking device 1 acts as an unloaded tuned tertiary winding in the transformer and the induction coil 29 as a secondary winding in the transformer. The secondary winding, i.e., the coil 29, is magnetically loosely coupled with the tertiary winding, i.e., the marking device 1, and the damped oscillatory response is thereby detectable. In an instrument, as in FIG. 2a, the basic frequency of the audible tone is dependent upon the repetition rate at which the induction field is generated, the detected modulation resembling the sawtooth-like waveform in FIG. 2f. If the marking device is outside of the effective coupling range the portion of the waveform in FIG. 2d following the limited cycles would be flat or include minor noise signal excursions only. As such there would be little or no detected signal supplied to the speaker 39 and thus no indication that a marker is present. The interrogating instrument in FIG. 2a was found effective up to a distance of about 3 feet from a marking device. When operated at a magnetic pulse repetition rate of between 400 Hz and 1,000 Hz an easily perceptible audio tone is generated when in the proximity of a marking device. The above-described interrogating instrument is relatively inexpensive to manufacture. However, its effective operating range is relatively short and its power requirements relatively high, particularly when operated at a rapid induction field generation rate. Thus in application as a portable field instrument the above-described interrogating instrument is less than adequate.

The distance over which an interrogating instrument is able to sense the presence of a marking device is, to a significant degree, dependent upon the amount of magnetic energy re-radiated therefrom. The amount of re-radiated magnetic energy is proportional to the amount of radiated magnetic energy absorbed and stored by the marking device. The amount of magnetic energy stored is dependent upon the correlation between the frequency of the induction field generated and the resonant frequency of the marking device. It is also dependent upon the total energy content of the generated induction field.

Figure 4:
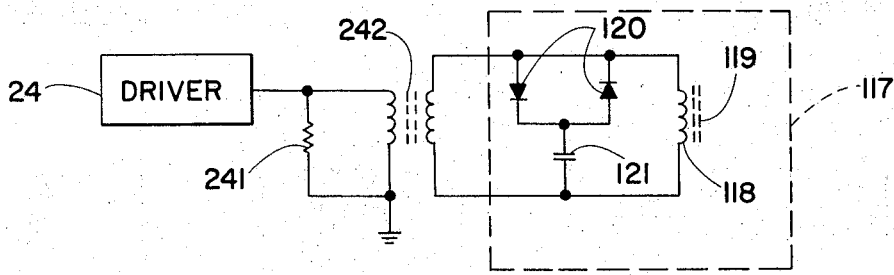
FIG. 4 is a block and schematic diagram showing a portion of the interrogating instrument in FIG. 3 in greater detail.
Figure 5:
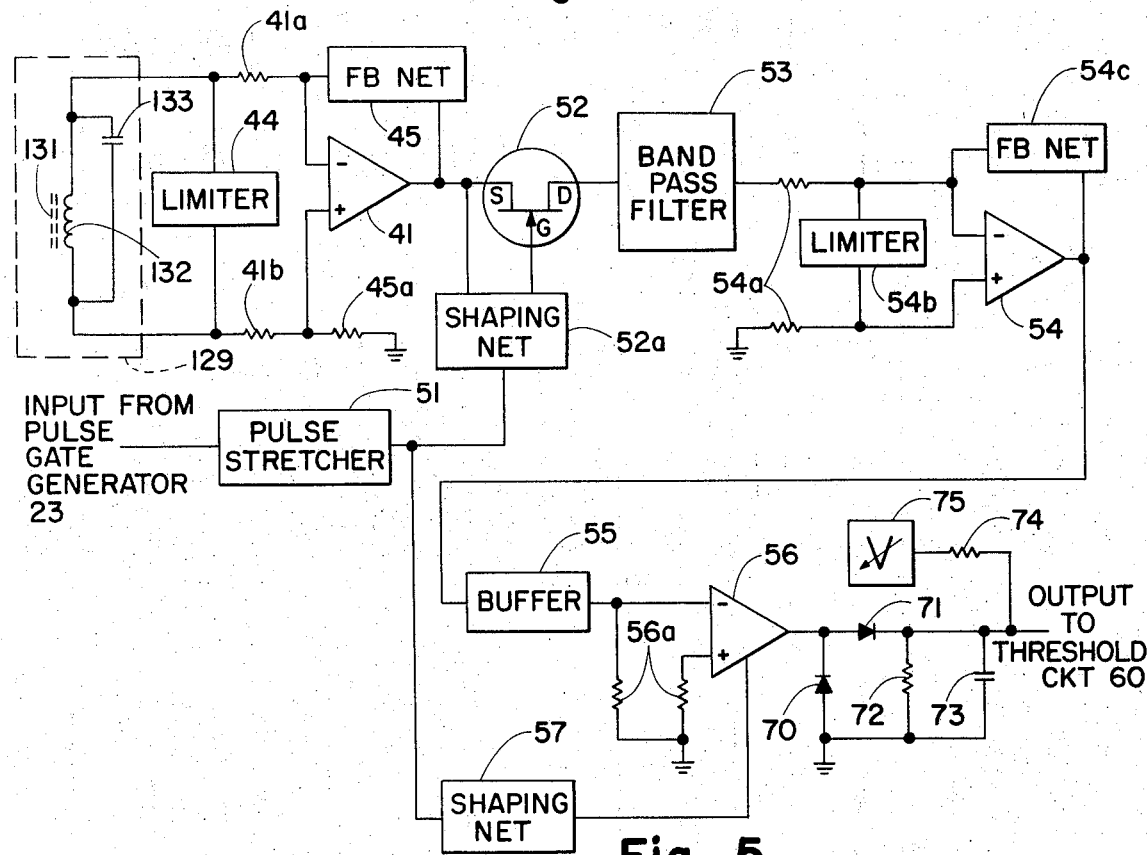
FIG. 5 is a block and schematic diagram showing a portion of the interrogating instrument in FIG. 3 is greater detail.

With the above criteria in mind an improved interrogating instrument as illustrated in FIGS. 3, 4 and 5 is particularly suitable in a portable configuration. In this instrument a low repetition rate of induction field generation in the form of a concentrated burst of individually lower energy magnetic pulses, reduces the power supply voltage and current requirements while providing a greater amount of effective magnetic energy in each induction field generation period.

Referring to FIG. 3, a voltage sweep generator 21 is connected to frequency control input of a gated voltage controlled oscillator 22. A gate pulse generator 23 is connected to the gating control input of the gated voltage controlled oscillator 22. The output of the oscillator 22 is connected to the input of a driver circuit 24. The output of the driver circuit 24 is connected to an induction device 117.

An induction device 129 is connected to the input of an amplifier 40. The output of the amplifier 40 is connected to the signal input of a gated detector 50. The output of the gate pulse generator 23 is connected to the gating control input of the gated detector 50. The output of the gated detector 50 is connected to the input of a threshold gate circuit 60. The output of the threshold gate circuit 60 is connected to the input of an indicator 61.

Basically, in operation the sweep voltage generator 21 provides about a 2 Hz sawtooth wave voltage which controls the frequency of a signal generated in the oscillator 22. Thus the frequency of the signal is varied between 60 KHz and 65 KHz, twice a second. The oscillator 22 is gated ON during the presence of the gate pulse signal from the gate pulse generator 23. It has been found satisfactory to gate the oscillator 22 ON for about 2.5 msec. periods repetitively at about a rate of 100 Hz. The resulting gated signal from the oscillator 22 is amplified by the driver circuit 24 and applied to the induction device 117 so that a corresponding induction field is established.

When the interrogating instrument is in the vicinity of a marking device or marker the induction device 129 receives some magnetic energy from the marker as well as receiving some magnetic energy from the induction device 117. Corresponding signals thus induced in the induction device 129 are amplified by the amplifier 40. The gated detector 50 is controlled by the presence of a gate pulse signal so that it is inhibited from detecting. Signals from the amplifier 40 are detected only during the absence of a gate pulse signal. Thus it is only during the time intervals when there is substantially no induction field from the induction device 117 that the detector 50 detects signals from the amplifier 40. Hence it is substantially only those signals induced in the induction device 129, indicating the presence of a marking device, which are detected. The detector 50 supplies a detected signal to the threshold circuit 60. If the detected signal is of sufficient magnitude, the threshold circuit 60 in turn activates the indicator 61.

As generally stated before, oscillator 22, under the combined control of the sweep generator 21 and the gate pulse generator 23, generates a burst of oscillation 22a which is fed to the driver 24. Basically the driver 24 functions as a class C amplifier to correspondingly drive the induction device 117. The corresponding induction field pumps the nearby marker which responds by ringing to an ever increasing amplitude of oscillation until the induction field is terminated. The first sign of a nearby peg is that of short indication, twice per second, and as the interrogating instrument is moved closer to the marking device the indication from the indicator 61 becomes more rapid and finally tends to be a continuous indication.

In the design of the instrument care was taken to utilize circuitry and operating techniques which inject as little signal onto the power distribution leads as possible. The amplifier 40 and the detector 50 are of necessity relatively sensitive circuits and thus in a practical instrument are somewhat prone to disturbances by power supply fluctuation and noise. The driver 24 and the radiating device must also be designed to radiate a significant amount of oscillatory magnetic energy and thereafter almost immediately be electrically and magnetically quite. Otherwise, a weak response from a marking device, at a distance of 10 feet or more, may be masked by the instrument's "noisy" operating characteristics.

The sweep generator 21, the gate pulse generator 23 and the indicator 61 are all well known and warrant no further discussion. In one embodiment the indicator is provided by a piezoelectric audible tone generator available under the trademark SONALERT.

The gated voltage controlled oscillator 22 is of a type in which the oscillator itself is turned on and off, that is, not the type where merely the output of the oscillator is gated. This type of oscillator is used so that, during the off periods, there is no critical active signal source within the instrument which might disturb the amplifier 40 and the detector 50.

The threshold circuit 60 is characterized in that it possesses a so-called hysteresis. When the voltage from the detector 50 exceeds one value, the threshold circuit 60 enables the indicator and when the votlage from the detector 50 decreases to less than lower value the threshold circuit, a short time later, inhibits the indicator 61.

The driver 24, the induction device 117, the induction device 129, the amplifier 40 and the gating detector 50 are in one embodiment somewhat unique and hence are described further in more detail.

Referring to FIG. 4, the output of the driver 24, which is a class C amplifier, is connected to the primary winding of a step up transfromer 242, which is in parallel with a damping resistor 241. The induction device 117 includes a 118 which is 22 turns of about 26 gauge copper wire on a core 119 of M25 material. The coil 118 is distributed over the length of the core 119 to provide an optimum radiation efficiency and is connected across the secondary winding of the step up transformer 242 A capacitor 121 is connected between one end of the coil 118 and one end of a pair of diodes 120 connected in back-to-back parallel configuration. The other end of the diodes 120 is connected to the other end of the coil.

In operation, the coil 118 and the capacitor 121 function as a tank circuit, with the resistor 2/4, via coupling through the transformer 242, reducing the Q of the tank circuit to about 10. Thus the load impedance of the tank circuit is relatively constant between 60 KHz and 65 KHz. The diodes 120 provide a convenient means for preventing extended ringing in the tank circuit. While the driver 24 is driving the tank circuit, via the transformer 242, the effect of the diodes 120 is significant. However, when the driver 24 returns to and remains in a quiescent state, i.e., no signal, the signal in the tank circuit decays in a damped oscillatory manner. After a few time constants the forward voltage drop of the pair of diodes 120 effectively switches the capacitor 121 out of the tank circuit, whereafter the remaining signal in the coil 118 is swiftly quenched. Hence in the operation of the interrogating instrument the signals detected by the gated detector 50 are induced substantially from a source or sources other than the induction device 117. Further the sensitivity or effective operating range of the interrogating instrument is enhanced as the detector portion of the instrument is activated very soon after the response of a nearby marking device begins to decay, i.e., during the time when almost the strongest oscillatory response is available for detection.

As before stated the effective range over which an interrogating instrument is effective is dependent upon a number of factors. One very significant factor is the effective sensitivity of the detector or receiving portion of the instrument. Thus a detailed description of the receiving portion of FIG. 3 including the induction device 129, the amplifier 40 and the gated detector 50 follows, with reference to FIG. 5.

The induction device 129 includes a coil 132 on a core 131. The coil 132 is connected in parallel with a capacitor 133. In essence the induction device 129 is virtually identical to the marking device 1, in FIG. 1c, except that the ends of the coil are drawn out for connection to further circuitry. One end of the coil 132 is connected to the inverting input of an amplifier 41 via resistor 41a and the other end of the coil 132 is connected to the non-inverting input of the amplifier 41 via a resistor 41b. A feedback network 45 is connected between the output of the amplifier 41 and the inverting input of the amplifier 41. A resistor 45a is connected between the non-inverting input of the amplifier 41 and ground. A limiter 44 is also connected between the ends of the coil 132.

In this embodiment the remainder of the circuitry in FIG. 5 falls within the gated detector 50 in FIG. 3. A switching or gating circuit, including a field effect transistor (FET) 52 and a pulse shaping network 52a, is connected between the output of the amplifier 41 and the input of a bandpass filter 53. The FET 52 has source, drain and gate terminals labelled S, G and D respectively. The source terminal is connected to the output of the amplifier 41 and the drain terminal is connected to the input of the bandpass filter 53. The pulse shaping network 52a is connected between the source and gate terminals of the FET 52. A pulse stretching circuit 51 is connected between the output of the pulse gate generator 23 in FIG. 3 and the control input of the shaping network 52a.

The output of the bandpass filter 53 is connected to the inverting input of an amplifier 54 via one of a pair of equal resistances 54a. The non-inverting input of the amplifier 54 is connected to ground via the other of the pair of resistances 54a, the inputs of the amplifier thus being balanced. A limiting network 54b is connected between the inverting and non-inverting inputs of the amplifier 54. A feedback network 54c is connected between the output and the inverting input of the amplifier 54. The inverting input of an amplifier 56 is a-c coupled to the output of the amplifier 54 via a buffer circuit 55. The inventing and non-inverting inputs of the amplifier 56 are each connected to ground via equal resistances 56a and thus are effectively balanced. The amplifier 56 is of the variable trans-conductance (gm) type. An integrated circuit amplifier CA3080A available from Radio Corporation of America (RCA) has been found suitable. A shaping network 57 is connected between the output of the pulse stretching circuit 51 and the gain control input of the amplifier 56.

The cathode of a diode 70 and the anode of a diode 71 are connected to the output of the amplifier 56. The anode of the diode 70 is connected to ground. The cathode of the diode 71 is connected to a variable voltage source 75 via a resistor 74, to ground via the parallel combination of a resistor 72 and a capacitor 73, and to the input of the threshold circuit 60 in FIG. 3.

In operation of the circuitry illustrated in FIG. 5, induction field energy induces corresponding voltage signals in the coil 132. When the signal voltage exceeds a certain value, for example about 0.4 volts, the limiting cirucit 44 effectively clips the voltage signal. The resistors 41a and 41b are of equal value and in combination with the small signal impedance of the network 45 and the resistor 45 a provide a balanced input to the differential amplifier 41. Thus a high degree of common mode rejection is provided to balance out signals appearing between the induction device 129 and ground. The network 45 serves to limit the gain of the differential amplifier to about 100 and in addition limits the output voltage of the amplifier 41 by reducing the gain through negative feedback in the event of output signals greater than about 0.6 of a volt. This permits the amplifier 41 to recover from a saturating overdrive condition reasonably quickly.

The FET 52 is controlled by the shaping network 52a so that it is turned ON about half a millisecond after the gated voltage controlled oscillator 22 in FIG. 3 is turned OFF. The pulse stretching circuit 51 adds the half millisecond delay to the pulse gate signal from the pulse gate generator 23. The shaping network 52 combines the signal from the pulse stretching circuit 51 with a portion of the voltage at the source terminal of the FET 52 to supply the required control bias voltage to the gate terminal of the FET 52. The shaping network 52a also reduces the rise time of the pulse from the pulse stretching circuit 51 so that voltage spikes will not be introduced into the signal leaving the drain terminal which may otherwise interfere with the operation of the bandpass filter 53. The FET 52 may be suitably provided for example by a device available commercially under the number 2N4093. The bandpass filter may be provided for example by a multiple LC network with appropriate input and output matching so that a 60 to 65 KHz bandpass is achieved. Output signals from the bandpass filter fall substantially between 60 KHz and 65 KHz and are conducted to the inverting input of the amplifier 54. The amplifier 54 is limited to a gain of about 100 by the feedback network 54c and again the output is limited by the feedback network to a voltage of not more than about 0.6 volts. Similarly the input to the amplifier 54 is limited by the limiter circuit 54b. The output of the amplifier 54 is buffered by the buffer 55 and thereafter connected to the input of the trans-conductance amplifier 56.

The shaping network 57 shapes the signal from the pulse stretching circuit 51, so that the signal delivered to the control input of the amplifier 56 generally corresponds, in amplitude shape, to the amplitude envelope of a damped oscillatory signal in a typical marking device 1. Thus the gain of the amplifier 56 is controlled to be high when a maximum response would occur and taper off to a very low gain just prior to a further burst of magnetic energy being radiated from the instrument. This form of synchronous non-linear amplification tends to provide a more constant signal-to-noise ratio at the output of the amplifier 56, when the instrument is in the nearby presence of a marking device 1. Thus the interrogating instrument is provided with a high degree of sensitivity to marker device response while having an improved immunity to general background noise which may otherwise yield false indications regarding a marked location.

The output of the amplifier 56 is half-wave rectified. i.e., detected, by the diode 71 and then filtered by the parallel combination of the resistor 72 and the capacitor 73. The time constant of the combination is selected to provide a maximum detected voltage to the following threshold circuit, having regard to the normal interrogation repetition rate of the interrogating instrument. The variable voltage source 75 is combination with the threshold circuit 60, in FIG. 3, effectively provide the interrogating instrument with variable indication sensitivity.

In either of the embodiments in FIGS. 2a and 3, the indication devices 17 and 29 or 117 and 129 respectively, are relatively closely spaced in a parallel arrangement, about three to four inches apart. This close relationship is more or less the result of a practical packaging requirement in a portable instrument. It is advantageous to have minimized magnetic coupling between the coil in each of the respective devices. Thus the core and coil assembly in one device is staggered with respect to the core and coil assembly in the other device. The center of the coil in the induction device, 29 or 129, lies about opposite one of the ends of the core in the induction device 17 or 117 respectively. With this arrangement the induction field from the one device induces self-cancelling signals in the coil in the other device. Thus signals induced across the coil in the induction device 29 or 129 by the induction field from the induction device 17 or 117 respectively, are minimized.

Figure 6:
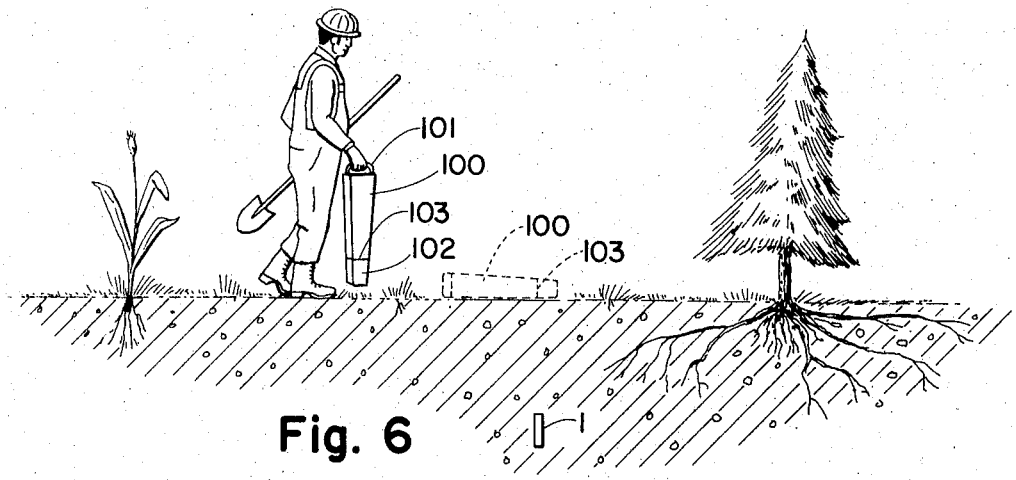
FIG. 6 is a pictorial illustration of an interrogating instrument, as illustrated in FIGS. 2a or 3, being used to find a buried location marked with the marking device illustrated in FIGS. 1a, 1b and 1c.

Referring to FIG. 6 an operator is shown traversing an area while holding an interrogating instrument 100, similar to that described in FIGS. 3, 4 & 5, by a carrying hanndle 101 affixed to one end thereof. The induction devices 117 and 129 reside in the lower and opposite end 102 of the instrument 100. A distinctive mark 103 on the side of the instrument in the area of the opposite end 102 indicates a point equidistant between the ends of the coil 132 in the induction device 129. The operator is shown approaching the general area where a marking device 1 is buried in vertical orientation and should be receiving an audible indication of the presence of the marking device 1. As the operator transverse the area approaching the marking device 1 an audible indication is first discernible as short beeps. The operator continues in a straight line through a steady tone area. From the center of the tone line just traversed the operator proceeds along a line perpendicular to the first line to establish a second tone line. The marking device resides beneath the center of the second tone line. To this moment the operator has been using the interrogating instrument in a vertical mode, that is with the radiating and receiving devices 117 and 129 in a parallel orientation with the marking device 1. By this method the general area of the marking device is typically determined to be within a circle of less than about 1 foot in diameter.

To far more precisely define the location of the marking device, at least the coil 132 is rotated one-quarter turn to be generally parallel with the horizontal plane. To do this in practice both the coils 132 and 118 are rotated together. The operator carries the instrument 100 in a horizontal position rather than vertical and traverses the above-determined general area of the marking device, in a straight line along the longitudinal axis of the coil 132 until a minimum amount of audible indication or null is indicated by the instrument. Similarly, as above described, a second traverse is performed perpendicular to the first. A second null indicates the precise location of the marking device typically to within an area of about 2 inch or less. In FIG. 6 the interrogating instrument 100 is also shown in dotted outline in a horizontal position, with the distinctive mark 103 directly in line with the longitudinal axis of the marking device 1. In this position a minimum audio indication or null is indicated as the relative field intensity being sensed is minimal.

Referring to FIGS. 7a–7e the horizontal axis in each represents distances along the surface of a location, with the longitudinal axis of a buried marking device at the zero distance point. The vertical axis is marked in arbitrary percentage units representing perceived sound intensity. When an instrument similar to that illustrated in FIG. 3 including a SONALERT as an audible indicator is used, the operator perceives a tone when he approaches a marking device. The lines plotted in FIGS. 7a–7e are representative of the tone perceived by the average operator, in relation to the position of the instrument with respect to the marking device. The solid lines pertain to interrogation during which the longitudinal axis of the receiver coil in the instrument is in approximate parallel alignment with the longitudinal axis of the coil in the marking device. The audio indication perceived is very much compressed with respect to the actual magnetic energy received by the instrument from an interrogated marking device.

Figure 7A:
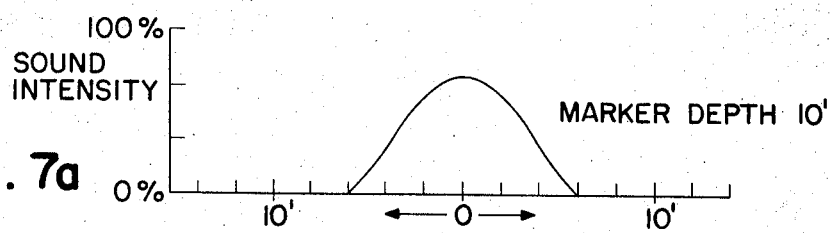
FIGS. 7a–7e are graphical representations of typical audio indication intensities perceived by an operator using the interrogating instrument in FIG. 3, in the near presence of the marking device illustrated in FIGS. 1a, 1b and 1c.
Figure 7B:
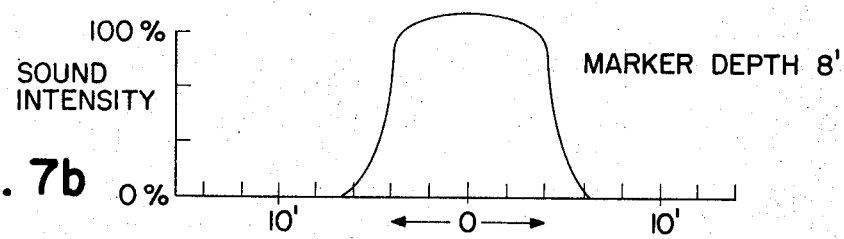
Figure 7C:
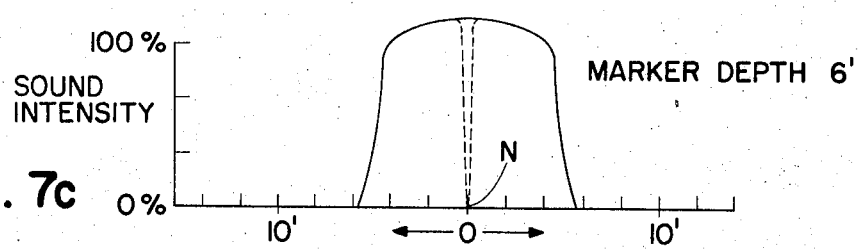
Figure 7D:
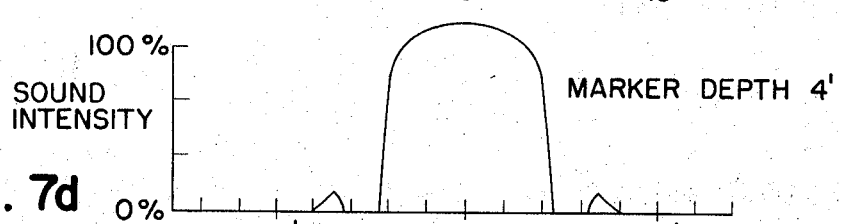
Figure 7E:
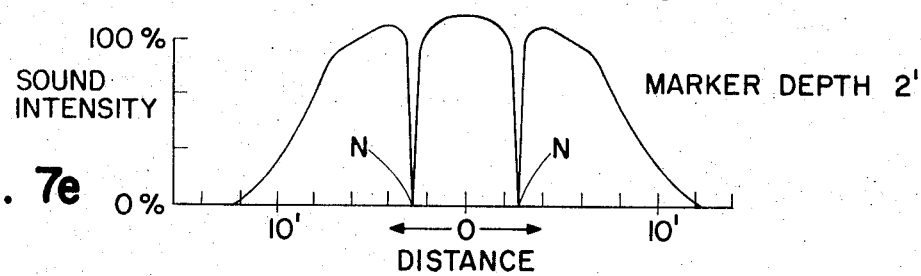

Referring to FIGS. 7d and 7e, it is evident that by determining the distance between the null points N one may approximately determine the depth at which a marking device is buried. Also with an instrument similar to that in FIGS. 3, 4 and 5 if no nulls can be found the operator can be sure that the marker is at least 6 feet beneath the surface. Referring to FIG. 7c the dotted line defining a null N' is a representative typical response perceived by an operator when the coil 129 is rotated through one-fourth turn as previously described in relation to FIG. 6. In this case the null occurs when the lateral axis of the coil in the receiving device is in alignment with the longitudinal axis of the coil in the marking device. With the present instrument an operator can pinpoint the position of a marker to within a circle having about a 2 inch diameter, when the marking device is buried about 6 feet in depth. The area of the null varies proportionately with distance from the marker. Accordingly, when a marker is closer to the surface the area of this null is less and when the marker is further away the area of this null is greater.

It is preferable to initially operate the interrogating instrument in a vertical position, i.e., with the longitudinal axis of the induction and marker coils in approximate parallel alignment as the presence of a deeply buried marker could be masked by the null when operating in a horizontal position.

The marking device is detectable over distances well in excess of 10 feet when a sensitive interrogating instrument is used, for example as illustrated in FIGS. 3, 4 and 5. Adverse soil conductivity appears to have little or no effect upon the finding of a location. For example, soil saturation with water of typical ocean salinity appears to have little or no effect on the detectability of a location. Of course, metallic sheets or other like sheets of highly conductive material interposed over a wide area between the marking device and the interrogating instrument substantially shield the marking device from the instrument, seriously degrading the detectability of the marking device.

The marking device and the interrogating instruments illustrated have only been described as being operated in a frequency spectrum of between about 60 KHz and 65 KHz however it appears that the frequency spectrum between about 40 KHz and 200 KHz is quite useful. This permits the allocation of different frequency bands to different users so that one user's markers are distinguishable from another's when using a suitably adapted interrogating instrument.

As before discussed, the interrogating apparatus or instruments substantially as herein described function on the basis of induction coupling and are very inefficient radiators of electromagnetic energy. Thus it appears that broadcast regulating agencies, in at least the United States and Canada, do not require licensing of these and similar interrogating instruments.

What is claimed is:

1. A passive marking device for placement in a location so that the location is thereafter identifiable with the use of an appropriate interrogating instrument, the marking device comprising:
   an elongated core in the form of a sintered body of ferrite magnetically soft material;
   a coil of conductive material encircling a portion of the core;

a capacitor connected across the coil, the assembly of the core, the coil and the capacitor providing a resonant circuit;

an encapsulation, encapsulating the resonant circuit, the encapsulation bonded to the surface of the core and being of a magnetically transparent material at least as brittle as the sintered ferrite material, the core, mechanically reinforced by the encapsulation and co-acts therewith to fracture as would a unitary body in the event of mechanical damage, evidence of such fracture being detectable by visual inspection of the marking device.

2. An interrogating instrument for indicating the presence of a marking device which includes a coil in a passive resonant electrical circuit, comprising:

means for generating a continuous wave sweeping frequency on an interrupted basis, the sweeping frequency being within a predetermined frequency range within which the marking device is resonant;

means for generating a magnetic field corresponding to the continuous wave sweeping frequency to induce ringing in the marking device, the magnetic field generating means including a resonant circuit having parallel inductance and capacitive elements and a pair of diodes in a back-to-back parallel configuration, said pair of diodes being in series with the capacitive element in the resonant circuit and thereby electrically disconnecting the capacitive element when signals in the resonant circuit are of a voltage less than the forward drop across said pair of diodes;

damping means resistively loading the resonant circuit to reduce the Q thereof so that the magnetic field generated thereby tends to be constant with respect to signals from the sweeping frequency generator, throughout said frequency range;

receiving means, including an induction coil, for receiving a ringing signal from a nearby responsively ringing marking device;

means, responsive to the interruptions in the continuous wave sweeping frequency, for generating signals corresponding to the envelope shape of the signal from a typical ringing marking device, during said interruptions;

means, synchronized with the interruptions in said sweeping frequency, for selectively filtering the signals from the signal receiving means and passing only those signals within said frequency range, during said interruptions;

a variable gain amplifier for amplifying the signals from the filtering means, the amplifier controlled by signals from the means for generating signals to have a positive gain proportional to said signals only during the interruptions in the sweeping frequency, whereby signals at the output of the amplifier tend to have a constant signal-to-noise ratio, so that the probability of detecting a nearby marking device is maximized while the probability of a false indication due to background noise is minimized;

means for providing an indication when the output from the variable gain amplifier is detected to exceed a predetermined level, said indication being indicative of the nearby presence of said marking device.

3. A method or using an interrogating instrument characterized by having a pair of induction coils in parallel alignment one with the other one associated with circuitry for generating a magnetic field on an interrupted basis, the other associated with circuits for detecting a resonant response to the magnetic field from a buried marking device having a passive resonant circuit including a vertically oriented induction coil, with the instrument operating, the method comprising the steps of:

a. traversing said area along a first substantially straight line, with the longitudinal axes of the pair of coils in approximate parallel alignment with said coil in the marking device, to determine the detectable boundaries of the induction field, resulting from said resonant response, along the first line;

b. traversing said area along a second substantially straight line as in step (a), approximately perpendicular to the first line, from a point on the first line approximately equidistant between the boundaries thereon determined, to determine the boundaries of said resulting induction field along said second line, the location of the marking device being approximately determined to be about equidistant between the boundaries along the second line;

c. rotating said coils in the interrogating instrument so that their longitudinal axes are in approximately perpendicular relationship with respect to the longitudinal axis of said coil in the marking device and thereafter traversing the location, found in step (b), along a third substantially straight line in the direction of the longitudinal axes of said coils, in the interrogating instrument, until a first minimum induction field point is detected;

d. rotating the longitudinal axes of the coils in the interrogating instrument through 1/4 turn while maintaining said perpendicular relationship and thereafter traversing the location along a fourth substantially straight line perpendicular to the third line from said minimum point, that is along the longitudinal axes of the coils in the interrogating instrument, until a second minimum induction field point is detected, said second point falling at the center of the induction coil associated with the detection circuitry and being in direct alignment with the longitudinal axis of the coil in the marking device.

4. An interrogating instrument, for indicating the presence and location of a marking device which includes a coil in a passive resonant circuit, comprising:

a first induction coil for generating a magnetic field in response to a current flow in the induction coil, a capacitor connected in parallel with the first induction coil to provide a high Q tuned resonant circuit;

a pair of diodes connected in back-to-back parallel configuration in series with the capacitor, the pair of diodes electrically disconnecting the capacitor from the circuit at signal voltage levels below the forward voltage drop of the diodes;

oscillator means responsive to gating pulses for generating, in the first induction coil, bursts of continuous wave current of a frequency at which the marking device is resonantly responsive, means for generating the gating pulses each having a period greater than that of a plurality of cycles of the continuous wave current, a second induction coil for generating current corresponding to fluctuations in a magnetic field cutting through the second coil, detection means, responsive to the gating pulses to be inactive during the presence of a gating pulse and active in the absence of a gating pulse, for detecting a fluctuating current in the second induction coil corresponding to the resonant frequency of the marking device.

5. An interrogating instrument, for indicating the presence and location of a marking device which includes a coil in a passive resonant circuit, comprising:

a first induction coil for generating a magnetic field in response to a current flow in the induction coil, and including amplification means and means for controlling the gain of the amplification means in response to the gating pulses to synchronously vary the gain of the amplification means from relatively high to relatively low, generally in profile with the amplitude envelope of the resonant response in a typical marking device, during interruption in the magnetic field, whereby signals at the output of the amplification means tend to have a constant signal-to-noise ratio, so that the probability of detecting a nearby marking device is maximized while the probability of a false indication due to background noise is minimized.

oscillator means responsive to gating pulses for generating, in the first induction coil, bursts of continuous wave current of a frequency at which the marking device is resonantly responsive, means for generating the gating pulses each having a period greater than that of a plurality of cycles of the continuous wave current, a second induction coil for generating current corresponding to fluctuation in a magnetic field cutting through the second coil, detection means, responsive to the gating pulses to the inactive during the presence of a gating pulse and active in the absence of a gating pulse, for detecting a fluctuating current in the second induction coil corresponding to the resonant frequency of the marking device.

* * * * *

UNITED STATES PATENT OFFICE
CERTIFICATE OF CORRECTION

Patent No. 3,836,842            Dated September 17, 1974.

Inventor(s)       Detlef ZIMMERMANN et al

It is certified that error appears in the above-identified patent and that said Letters Patent are hereby corrected as shown below:

[73] Assignee: should read --Northern Electric Company Limited, Montreal, Quebec, Canada .

The portion of claim 5 from col. 17, line 19 to col. 18, line 7, "and including.....noise is minimized.", should be removed and reinserted therein at col. 18, line 23 after "device.".

In col. 18, line 23, "device." should read --device,--.

Signed and Sealed this twenty-eight Day of October 1975

[SEAL]

Attest:

RUTH C. MASON
*Attesting Officer*

C. MARSHALL DANN
*Commissioner of Patents and Trademarks*